US012656125B2

(12) United States Patent
Møller et al.

(10) Patent No.: US 12,656,125 B2
(45) Date of Patent: Jun. 16, 2026

(54) METHOD OF PROVIDING AN ELECTRONIC MAP FOR A MARINE VESSEL

(71) Applicant: DANADYNAMICS APS, Svendborg (DK)

(72) Inventors: Lasse Skriver Møller, Svendborg (DK); Martin Stockholm, Svendborg (DK)

(73) Assignee: DANADYNAMICS APS, Svendborg (DK)

( * ) Notice: Subject to any disclaimer, the term of this patent is extended or adjusted under 35 U.S.C. 154(b) by 50 days.

(21) Appl. No.: 18/686,794

(22) PCT Filed: Aug. 29, 2022

(86) PCT No.: PCT/EP2022/073970
§ 371 (c)(1),
(2) Date: Feb. 26, 2024

(87) PCT Pub. No.: WO2023/031129
PCT Pub. Date: Mar. 9, 2023

(65) Prior Publication Data
US 2024/0384994 A1 Nov. 21, 2024

(30) Foreign Application Priority Data
Aug. 30, 2021 (EP) ..................................... 21193851

(51) Int. Cl.
*G01C 21/00* (2006.01)
*G01C 21/20* (2006.01)
(Continued)

(52) U.S. Cl.
CPC ....... *G01C 21/203* (2013.01); *G01C 21/3804* (2020.08); *G01C 21/3881* (2020.08); *B63B 49/00* (2013.01); *B63B 51/00* (2013.01)

(58) Field of Classification Search
CPC ............ G01C 21/3881; G01C 21/3811; G01C 21/367; G01C 23/00; G01C 21/387;
(Continued)

(56) References Cited

U.S. PATENT DOCUMENTS

2014/0222332 A1 8/2014 Lee
2014/0269191 A1* 9/2014 Iverson ................... G01S 15/89
367/88
(Continued)

FOREIGN PATENT DOCUMENTS

CN 118816995 B * 11/2024 ............. G08B 31/00
SE 543985 C2 * 10/2021 ............. G01C 21/00

OTHER PUBLICATIONS

Opitz, Felix, et al. "Data Analytics, Machine Learning and Risk Assessment for Surveillance and Situation Awareness." 2020 21st International Radar Symposium (IRS). IEEE, 2020.*
(Continued)

*Primary Examiner* — Cuong H Nguyen
(74) *Attorney, Agent, or Firm* — Nixon & Vanderhye P.C.

(57) ABSTRACT

A method of providing an electronic map for operating a marine vessel (37), the method comprising the steps of: providing (43) map data, dividing (45) the map data into a first cell and a second cell (39, 39a, 39b) defining a fixed geographical area of the map data, receiving (47) a first measurement from a first sensor of the marine vessel, where the first measurement comprises a first sensor parameter representing a measurement relating to the geographical area of the first cell and/or the second cell, determining (51) a risk assessment of the first sensor parameter, assigning (53) a first risk parameter to the first cell and/or the second cell, operating (55) the marine vessel based on the first risk parameter of the first cell and/or the second cell.

14 Claims, 4 Drawing Sheets

(51) Int. Cl.
    *B63B 49/00*       (2006.01)
    *B63B 51/00*       (2006.01)
(58) Field of Classification Search
    CPC .. G01C 21/20; G01C 21/203; G01C 21/3804;
                   G06F 3/0481; G06F 3/04817; G09B
                   29/007; G09B 29/005; B63B 49/00;
                                    B63B 51/00
    See application file for complete search history.

(56)                 References Cited

U.S. PATENT DOCUMENTS

| | | | |
|---|---|---|---|
| 2018/0259344 A1 | 9/2018 | Rachmawati | |
| 2018/0283874 A1* | 10/2018 | Hashizume | G09B 29/007 |
| 2020/0049507 A1* | 2/2020 | Clark | B63B 49/00 |
| 2020/0090426 A1* | 3/2020 | Barnes | G06N 5/025 |
| 2021/0019521 A1 | 1/2021 | Park | |
| 2022/0272168 A1* | 8/2022 | Raisher | G01C 21/36 |

OTHER PUBLICATIONS

Adland R, Jia H, Lode T, Skontorp J. The value of meteorological data in marine risk assessment. Reliability Engineering & System Safety. May 1, 2021;209:107480.*

Thombre, S., Zhao, Z., Ramm-Schmidt, H., Garcia, J.M.V., Malkamäki, T., Nikolskiy, S., Hammarberg, T., Nuortie, H., Bhuiyan, M.Z.H., Särkkä, S. and Lehtola, V.V., 2020. Sensors and AI techniques for situational awareness in autonomous ships: A review. IEEE transactions on intelligent transportation systems, 23(1).*

Perera, Lokukaluge P., Paulo Oliveira, and C. Guedes Soares. "Maritime traffic monitoring based on vessel detection, tracking, state estimation, and trajectory prediction." IEEE Transactions on Intelligent Transportation Systems 13.3 (2012): 1188-1200.*

Mejorin, Angela. Wind-Borne Debris Resistance of Façades: Identification of Alternative Impact Test Requirements. Diss. The University of Western Ontario (Canada), 2022. (Year: 2022).*

De Almeida, Ana Filipa Simão. Mcity: Using Smart City Monitoring Data to Characterize and Improve Urban Mobility. MS thesis. Universidade de Aveiro (Portugal), 2021. (Year: 2021).*

Vican[1], Victor "Check for updates Exploring Interdependency Effects of Production Orders as Central Impact Factors of Logistics Performance in Manufacturing Systems." Advances in Production Management Syst AI for Sustainable and Resilient Production Systems: : IFIP WG 5.7 Inter Conf, APMS (Year: 2021).*

International Search Report for PCT/EP2022/073970, mailed Jan. 4, 2023, 5 pages.

Written Opinion of the ISA for PCT/EP2022/073970, mailed Jan. 4, 2023, 6 pages.

* cited by examiner

METHOD OF PROVIDING AN ELECTRONIC MAP FOR A MARINE VESSEL

CROSS-REFERENCE TO RELATED APPLICATIONS

This application is the U.S. national phase of International Application No. PCT/EP2022/073970 filed Aug. 29, 2022, which designated the U.S. and claims priority to EP 21193851.9 filed Aug. 30, 2021, the entire contents of each of which are hereby incorporated by reference.

TECHNICAL FIELD

A method of providing an electronic map for operating a marine vessel, the method comprising providing map data, dividing the map data into a first cell and a second cell defining a fixed geographical area of the map data and receiving first sensor measurements to update a risk assessment of the first cell and/or the second cell.

BACKGROUND

It is known for unmanned marine vessels to use onboard sensing systems to build a local map of their environment in real time and to use this map for self-navigation. Map data collected may identify static obstacles such as land masses, as well as dynamic obstacles such as other vessels moving within the mapped environment.

US 2018/0259344 discloses a system for building map data to assist the navigation of an unmanned marine vessel.

However, the known methods for providing maps of the environment provide systems where the obstacles are classified on a binary basis, which means that the map data has no qualitative information on the obstacles, where all obstacles are classified in the same manner. Thus, when the map data is utilized for an unmanned marine vessel, the data may not allow the system to provide nuanced data on the obstacles, which may limit the maneuverability of the marine vessel significantly.

It is therefore an object of the present invention to provide an improved method of providing map data for a marine vessel, and especially for an unmanned marine vessel.

DESCRIPTION

In accordance with the invention there is provided a method of providing an electronic map for operating a marine vessel, the method comprising the steps of: providing map data, dividing the map data into a first cell and a second cell defining a fixed geographical area of the map data, receiving a first measurement from a first sensor of the marine vessel, where the first measurement comprises a first sensor parameter representing a measurement relating to the geographical area of the first cell and/or the second cell, determining a risk assessment of the first sensor parameter, assigning a first risk parameter to the first cell and/or the second cell, operating the marine vessel based on the first risk parameter of the first cell and/or the second cell.

By providing an electronic map for operating a marine vessel using sensor information to update the map data, it may be possible to provide a map for a marine vessel where the electronic map allows the marine vessel to navigate waters, coastlines and/or harbors in a safe manner without risking collisions with a high number of obstacles, and allowing the electronic map to have detailed information on specific cells of the map where the risk is classified for the specific cell.

Thus, if a marine vessel is configured to chart or inspect harbor areas where there are a number of dynamic or stationary obstacles, it may be possible to increase the areas of the harbor where the marine vessel can safely navigate without risking damage to the marine vessel and/or surrounding marine vessels or structures.

The map data may be divided into a first cell and/or a second cell, where the first cell and/or the second cell represent a geographical area of the electronic map. The sensor may be adapted to obtain sensor data from the geographical area of the first cell and/or the second cell. The sensor data may be data relating to a first measurement performed by a sensor of the marine vessel, and may represent an obstacle that may be present on the surface of a body of water or may relate to an obstacle that may be below the surface of a body of water. The first measurement may also represent that an object is not detected in the first cell and/or the second cell.

The first measurement may be represented in the form of a first sensor parameter, where the first sensor parameter may be a raw or a processed version of the first measurement and may contain sensor information received from the first cell and/or the second cell.

The first sensor parameter may be input into a processor unit, where the processor unit provides a risk assessment of the first sensor parameter. The first sensor parameter may define a certain situation of the first cell and/or the second cell, where the risk assessment may classify the first sensor parameter in accordance with predefined and/or adaptive rules, which may indicate the types of risks that may be present in the first cell and/or the second cell and provide a risk assessment of the first sensor parameter.

The risk assessment may be utilized to provide a risk parameter, where the risk parameter may be a qualitative and/or a quantitative parameter defining the risk factors that may affect the marine vessel in the first cell and/or the second cell. The risk parameter may be assigned to the first cell and/or the second cell, where the risk parameter may provide an indication of whether the first cell and/or the second cell are safe to operate the marine vessel through. The risk parameter may define whether the particular cell should be seen as a high-risk area or whether the particular cell should be seen as a low-risk area.

The provision of a risk parameter in the first cell and/or the second cell may allow the marine vessel to be manoeuvred on the body of water in a safe manner, where the risk parameter of the first cell and/or the second cell defines whether the marine vessel will be navigated to or through the first cell and/or the second cell of the map.

Within the understanding of the present disclosure, the map data may be understood as providing electronic map data, where the electronic map data may be in the form of an electronic nautical/marine chart having information on marinas, docks, boat ramp location, depth levels, underwater structures, tidal information, shipping lanes, sailing lanes and other relevant information. The map data may be in the form of a graphic representation of a sea area and adjacent coastal regions, and it may show depths of water and heights of land (topographic map) natural features of the seabed' details of the coastline, navigational hazards, locations of natural and human-made aids to navigation, information on tides and currents, local details of the Earth's magnetic field, and human-made structures such as harbors, buildings, and bridges.

In one or more exemplary embodiments, the risk assessment may be understood as being a safety assessment, where the risk assessment and/or the risk parameter may be seen as a safety assessment. Thus, instead of defining the risk parameter as a risk of intersecting a stationary or a moveable object, a safety parameter may be determined, which defines how safe it may be to operate within the first cell and/or the second cell. This may be helpful in open water, where any area of the body of water is deemed as being safe until it is determined that there may be a stationary or moveable object within the area, and thereby a determination of the safety parameter may be applied to the first cell and/or the second cell. Such a safety parameter may be used in areas where the likelihood of intersecting an object that may be harmful for the marine vessel is very low.

In one or more exemplary embodiments of the present invention, the method may be utilized for operating an autonomous marine vessel. The operation of the autonomous marine vessel may include a computer system for controlling the operation of the autonomous marine vessel. The computer system may include a control module, where the control module may operate in accordance with a controller, which may include one or more processors having short-term and/or long-term data storage, storage device and instructions stored in a memory that can carry out the operations of the controller when the instructions are executed. The controller may receive data representing a desired task, where the desired task may include operation of the autonomous marine vessel in a predefined area of the electronic map. The risk parameter of the first and/or the second cell may be utilized to adapt the operation of the marine vessel in the predefined area of the electronic map. In an alternative, the controller may receive data representing a desired task, where the desired task may include instructions to travel from point A to point B of the autonomous marine vessel in an area of the electronic map. The risk parameter of the first and/or the second cell may be utilized to adapt the operation of the marine vessel in defining the route from Point A to Point B of the electronic map.

In an embodiment, the controller may receive data representing a desired output. The desired output typically includes a velocity, e.g., a speed and a heading. The desired output can be based on, for example, data received from a planning module. In accordance with the desired output, the controller produces data usable as a throttle input and a steering input. The throttle input may represent the magnitude in which to engage the throttle (e.g., acceleration control) of the marine vessel to achieve the desired output. In some examples, the throttle input also includes data usable to engage a deceleration control of the marine vessel. The controller may receive a steering input which represents a steering angle, e.g., the angle at which the steering control (e.g., steering wheel, steering angle actuator, or other functionality for controlling steering angle) of the marine vessel should be positioned to achieve the desired output. The speed and the velocity of the marine vessel may be controlled by comparing positional data and/or directional data which may be received from positioning systems, such as a GPS system.

In one or more exemplary embodiments, the first measurement of the first sensor may be introduced into a classification unit, where the information of the first measurement may be classified into parameters that define a known or a learnt situation and/or object. The classification unit may receive the first measurement and compare the first measurement with a one or more known scenarios, where the classification unit may label the first measurement based on probabilities of the information that may be present in the first measurement. The classification unit may be in the form of a pattern recognition system, which may recognize patterns in the data present in the first measurement and/or subsequent first measurements. The patterns may be recognized on the basis of training data, which may have been introduced into the classification unit, or may be utilized to discover previously unknown patterns present in the data of the first measurement.

In one or more exemplary embodiments, the first cell and the second cell have a geographical area, and/or where the geographical area has a predefined size. The first cell and/or the second cell may be defined as having a predefined size, where the predefined size may be represented as a predefined two-dimensional area which may be represented in the map data. The first and/or the second cell may be static areas of the map data, where the cells may have static coordinates and/or static boundaries that are represented in the map data. Thus, when the map data has been divided into a first cell and/or a second cell, the first cell and the second cell may be set or superimposed on the map during the operation of the marine vessel or may in some situations be defined as long-lasting or permanent cells in the map data, which may be utilized at a later operation of the marine vessel.

The size of the first and/or the second cells may be varied depending on the operation of the marine vessel, where an operation of the marine vessel in an area having a high risk, e.g., in a harbor or a marine, may reduce the size of the first and/or the second cell to increase a resolution of the cells, or when the marine vessel is operating in open water, i.e., in an area having low risk, the size of the cells may be increased to reduce the resolution. The increase and decrease in resolution may optimize data capability of the marine vessel, as low resolution requires less data capacity than high resolution.

Furthermore, the real-life size of the first and/or the second cell may be varied on the basis of the manoeuvrability of the marine vessel using the method. The manoeuvrability of a marine vessel may be dependent on the size of the marine vessel, as well as the velocity and/or braking or slowing down capabilities of the ship, where these factors may be taken into consideration. As an example, if the present method is used for a container ship, a first and/or second cell size of $1 \times 1$ m would present a resolution that is much too detailed for the marine vessel, while a larger size, such as $10 \times 10$ m, $50 \times 50$ m or similar would provide the electronic map and the control input with sufficient detail to control the marine vessel safely. However, a smaller vessel like a rib or a marine drone, which are highly manoeuvrable and have good slowing down capabilities, can react quickly and are often manoeuvred in harbors or in waters having small obstacles, such as small boat harbors, which would have a great use of cell sizes that are smaller. Thus, in one embodiment, the size of the first and/or the second cell may be varied based on a first marine vessel parameter, such as size, velocity or braking capabilities.

In one or more exemplary embodiments, the map data is marine chart data. The marine chart data may be in the form of an electronic nautical/marine chart having information on marinas, docks, boat ramp locations, depth levels, underwater structures, tidal information, shipping lanes, sailing lanes and other relevant information. The map data may be in the form of a graphic representation of a sea area and adjacent coastal regions, and it may show depths of water and heights of land (topographic map) natural features of the seabed, details of the coastline, navigational hazards, locations of natural and human-made aids to navigation, information on tides and currents, local details of the Earth's magnetic field, and human-made structures such as harbors, buildings, and bridges.

In one or more exemplary embodiments, the risk assessment comprises identifying possible objects present in the first cell and/or the second cell. The first sensor may receive a first measurement from a position which may be seen within the first and/or the second cell, and where the first measurement contains information about the position within the first and/or the second cell. The first measurement may be processed into a first sensor parameter, where the first sensor parameter indicates that there is an object present in the position that corresponds to the area or part of an area of the first and/or the second cell. If an object is detected within the first cell and/or the second cell, a risk assessment is performed by a processor, where the risk assessment results in a risk parameter of the first cell and/or the second cell based on the detection of an object within the first cell and/or the second cell. The risk parameter may be utilized to define whether or not the marine vessel can safely operate in the area of the first cell and/or the second cell.

Within the understanding of the present invention, the term "present in the first cell and/or the second cell" may mean that an object is present within a two-dimensional area of the cell, where the object may be present in any elevation within the cell. Thus, the object may be present within the two-dimensional area of the cell, where the object may be below the surface of the water, on the surface of the water or above the surface of the water. It may be understood that risk assessment of the elevation of the object may be dependent on the physical elevation of the marine vessel. Thus, if the marine vessel has a maximum height of 2 meters above the waterline, an object detected 10 meters above the surface will not represent a high risk for the marine vessel. Similarly, if the marine vessel sits at a maximum of 1 meter below the waterline, an object detected at a minimum depth of 4 meters may be seen as a low-risk object, as there is a low risk of coming into contact with object. The opposite may be stated if an object is detected at 0.5 meters, where the object may be classified as a high-risk object.

In one or more exemplary embodiments, the map data may be divided into a plurality of cells. By dividing the map data into a plurality of cells, it may be possible to divide the map data into multiple cells, where each cell defines an area of the map data. The plurality of cells may be in the form of a matrix of cells that abut each other, where each cell has a specific identity based on its specific position in the map data. Thus, each cell of the plurality of cells may be provided with a risk parameter based on sensor data.

In one or more exemplary embodiments, the first measurement may be input in a classification unit where the content of the first measurement is processed to recognize information available from the data available from the first measurement. The classification unit may be a pattern recognition unit, where the pattern recognition may be, e.g., provided via a neural network or other means of machine learning. The classification unit may be trained by providing measurements where the content of the measurement is known beforehand. The training data may be provided into the classification unit in order to improve the classification and to improve the classification unit in performing predictions on known situations. Thus, the training data may be utilized to build the pattern recognition model for the marine vessel, where the training data may be introduced into the classification unit to predict situations that may occur when operating a marine vessel in predefined situations. Should the classification unit not be able to recognize the data present in the first measurement, the non-recognized data may be given a first sensor parameter that recognizes non-recognized data, and the risk assessment may be based on non-recognized data.

In one or more exemplary embodiments, the first cell abuts the second cell in a geographical manner. This may mean that the first cell and the second cell abut each other, and where the first cell and the second cell may define a geographical area that is double the size of one of the cells, and where the first cell and the second cell define a continuous area. However, the first cell and the second cell may have different risk parameters, meaning that the marine vessel may be operated or controlled through the first cell while not being controlled through the second cell.

The first and/or the second cell may be polygonal in shape, i.e., in the form of a plane shape having a finite number of straight line segments connected to form a closed polygonal circuit. The cells may be in the shape of a triangle, quadrilateral, pentagon, hexagon or any suitable shape. Each cell may have a different shape from its abutting cell. In one example, the cells may define a quadrilateral grid or a hexagonal grid defining at least part of the map data. In one embodiment, the cells may divide the areas that are theoretically accessible by a marine vessel. This means that the parts of the maps that have a body of water are divided into a first cell and a second cell, or a plurality of cells, and the areas of the map that are not accessible by a marine vessel may not be divided into cells.

In one or more exemplary embodiments, the first cell may have a first shape and the second cell may have a second shape, where the first and the second shape may be different from each other. This means that if the first cell is pentagonal, the second cell may be hexagonal, quadrilateral or any other shape that suits the optimization of the method.

In one or more exemplary embodiments, a first area of the first cell may overlap a second area of the second cell. Thus, the first cell and the second cell may have an overlapping area where the risk parameter may be influenced by the first risk parameter and/or the second risk parameter.

In one or more exemplary embodiments, a first area of the first cell may be positioned at a distance from a second area of the second cell. Thus, the first cell and the second cell may be positioned at a distance from each other.

In one or more embodiments, a risk assessment of a first and/or a second cell may include dividing the first and/or the second cell into more than one cell, which this may mean that the first and/or the second cell, which has a predefined size in one application of the method, may be divided into a plurality of further cells, where each of the further cells has a size that is smaller than the first and/or the second cell. Thus, if a marine vessel is operated at sea, where the size of the first and/or the second cell is relatively large due to a low risk of interacting with objects within the body of water, and where a risk assessment indicates a higher risk, the method and the system may be capable of subdividing the first and/or the second cell into further cells to increase the resolution of the area where the risk assessment has been made. By doing this, it is possible to reduce the processor usage during operation in low-risk areas, but the method and the system react to a risk assessment by increasing the computing power to provide an improved and/or higher resolution risk assessment in a first and/or a second cell. If a risk assessment has been made, the plurality of cells may be joined into a larger cell to reduce the computing power needed during operation.

In one or more exemplary embodiments, the choice of size of the first and/or the second cell may be influenced by a predetermined part of a particular route, a particular timeline, or may be influenced by a change in direction of the marine vessel. Thus, if a marine vessel is to sail from point A to point B, and point A and/or B are in a harbor while the route between points A and B is in open water, the method and the system may change the size of the first and/or the second cell based on a predetermined risk. Thus, in the harbor, the risk of intersecting a moveable and/or stationary object is relatively high, the system and/or method may divide the map into a first cell and a second cell that have a first size, and while at open water the system and/or method may divide the map into a first cell and a second cell that have a second size, where the second size is larger than the first size. Thus, the resolution of the risk parameters in the first and/or the second cell is larger in the harbor than in open water.

In one or more exemplary embodiments, the map data includes data or measurements of depth in a body of water. This means that at least part of the map data may include data that indicates the depth of a body of water. If such information is not available to a part of the map that is divided into a cell, the depth may be extrapolated from neighbouring cells or the data may be received from depth measurements provided by the marine vessel or other marine vessels.

In one or more exemplary embodiments, the receiving of the first measurement is performed at regular intervals. By performing first measurements at regular intervals, such as multiple times pr. second, it may be possible to obtain a real-time risk assessment of the first cell and/or a second cell, where the data included in a first measurement may change over time. This may, e.g., mean that if a first measurement performs a measurement at time zero and may, e.g., provide a measurement where the data of the measurement indicates an object in the area of the first cell, a secondary first measurement of the same area may produce data that indicates that the object is no longer present in the area, and/or the risk assessment and the risk parameter of the cell may be updated with this information. This information might also indicate that the object detected in the primary first measurement may be a dynamic object.

The classification unit may process the primary first measurement and the secondary first measurement and classify the object as a dynamic object, where the classification may include the velocity/speed of the object and/or a heading of the object. The classification may be communicated to the processor, where the processor may assign a first risk parameter to the first cell, and where the processor may utilize the velocity/speed and heading of the object and assign a risk parameter to the cells which intersect the heading of the dynamic object, and may determine a risk parameter for the cells which intersect the heading of the dynamic object. This means that the classification of a dynamic object may be utilized to update a future risk assessment of a plurality of cells of the map data, and thereby indicating that the dynamic object will be present in the cells in a given amount of time. The classification unit and/or the processor unit may subsequently be utilized to verify the risk assessment of the dynamic object and the cells influenced by the dynamic object (cells that intersect a vector starting in the first cell, and being parallel to the heading of the object).

In one or more exemplary embodiments, the first risk parameter is based on a plurality of measurement parameters. The marine vessel may comprise one or more sensors, providing one or more measurement parameters. The plurality of measurement parameters may come from different types of sensors, where the plurality of measurements may be utilized to determine the risk assessment and/or the first risk parameter of the first cell and/or the second cell. Thus, if a risk parameter is defined from a plurality of measurements, each measurement may influence the risk assessment of the first cell and/or the second cell, where the risk assessment may increase or decrease based on each measurement used for the risk assessment. However, it may be understood that certain types of measurements are absolute and that if the risk assessment has been set high, other measurements cannot change this. This may be, e.g., when a depth measurement shows that the marine vessel cannot operate in the first cell, a camera cannot override or reduce the risk of this measurement.

In one or more exemplary embodiments, the method may further comprise the step of receiving a first data parameter, where the risk assessment is further determined using the first data parameter. The first data parameter may be obtained from GPS, Ship Log, Weather Data or AIS transponder.

The automatic identification system (AIS) is an automatic tracking system that uses transceivers on ships and is used by vessel traffic services (VTS). When satellites are used to detect AIS signatures, the term Satellite-AIS (S-AIS) is used. AIS information supplements marine RADAR, which continues to be the primary method of collision avoidance for water transport. Although technically and operationally distinct, the ADS-B system is analogous to AIS and performs a similar function for aircraft. Information provided by AIS equipment, such as unique identification, position, course, and speed, can be displayed on a screen or an electronic chart display and an information system (ECDIS). AIS is intended to assist a vessel's watch-standing officers and allow maritime authorities to track and monitor vessel movements. AIS integrates a standardized VHF transceiver with a positioning system, such as a Global Positioning System receiver, with other electronic navigation sensors, such as a gyrocompass or rate-of-turn indicator. Vessels fitted with AIS transceivers can be tracked by AIS base stations located along coast lines or, when out of range of terrestrial networks, through a growing number of satellites that are fitted with special AIS receivers which are capable of deconflicting a large number of signatures.

In one or more exemplary embodiments, the first sensor may be one or more of LiDAR, RADAR, optical camera, FLIR Camera, Multibeam Sonar, Ultrasound and Acoustic Microphone.

LIDAR (Light Detection and Ranging) may be utilized for detection of objects in the nearfield area, 0-150 meters. The LiDAR technology may be utilized to gather a large amount of range measurements at a high precision. LiDAR measurements are done by sending a high frequency of laser pulses. The distance is calculated by assessing the time in which the light is reflected of an object. The LiDAR used may have a range of between 0-300 meters. The output of LiDAR is a 3D pointcloud, and the resolution means that objects that are at least 0.5 degrees horizontally will give a useful reflection. The LiDAR gives a robust output, but has also an uncertainty in that it may give a number of false positives. The classification system may be utilized to reduce the false positives by classifying the data of a LIDAR.

RADAR (Radio Detection and Ranging) is a detection system that uses radio waves to determine the distance (range), angle, or velocity of objects. It can be used to detect aircraft, ships, spacecraft, guided missiles, motor vehicles, weather formations, and terrains. A RADAR system comprises one or more transmitters producing electromagnetic waves in the radio or microwaves domain, a transmitting antenna, a receiving antenna (often the same antenna is used for transmitting and receiving) and a receiver and processor to determine properties of the object(s). Radio waves (pulsed or continuous) from the transmitter reflect off the object and return to the receiver giving information about the object's location and speed. The RADAR may be utilized for long-range detection from 0.1 to 10 nautical miles. The RADAR is very sensitive to meteorological conditions such as rain, vapor in the air, fog and waves, which means that there is a lot of noise in the RADAR signal. When a RADAR signal is filtered, it may be utilized to support optical camera technology in object detection of marine vessels at large distances, which means that the RADAR is important when the marine vessels are in open water.

Optical cameras may be utilized to monitor the horizon, where a plurality of cameras may be utilized to cover the horizon at 360 degrees. Camera data may be utilized for the following areas:

a camera may be the operator's eyes of the system, should it be necessary to override the autonomous system of the marine vessel and operate manually.

The camera sensor data may be utilized to train the classification system of object recognition.

Camera sensor data may be obtained in real time for object classification and risk assessment for assigning a first risk parameter and/or a first sensor parameter to the cells.

FLIR (Forward-looking infrared) camera is a camera with infrared and night vision technologies. These cameras may be utilized where daylight might not be available. FLIR may be utilized in a similar manner as an optical camera and used for similar applications in the classification.

Multibeam sonar scans the bottom of the body of water in real time in 3D. Multibeam systems emit acoustic waves in a fan shape beneath the transceiver of the multibeam echo-sounder. The length of time it takes for the sound waves to reflect off the seabed and return to the receiver is used to calculate the water depth. Unlike other sonars, multibeam systems use beamforming to extract directional information from the returning signals. The output may be a 3D point-cloud that provides highly accurate information about the depth. The multibeam sonar may be utilized when the marine vessel is travelling in areas where depth information is not available from the map data or is different from the map data, and may be utilized as a sensor input for the present method.

Ultrasound sensors may measure distance using ultrasound. An ultrasound scan may cover distances of 0-15 meters, and is known by, e.g., parking sensors of cars. Ultrasound sensors may be utilized in close proximity to docks and/or stationary ships, boats or other stationary objects in a harbor. The sensor info may be utilized to allow the marine vessel to pass close to stationary objects without coming too close. The sensor info may be introduced into the present method to detect close stationary objects.

An acoustic microphone may capture sound signals from other marine vessels. Sound signals are very important, as maneuvering is to be performed where sound signals indicated the maneuvering and also when visibility is low. In foggy conditions, the RADAR, LIDAR and/or camera may be unreliable. The sound signal measurements may be introduced as first or subsequent measurements into the method, where the sound signals may be utilized together with other measurements.

In one or more exemplary embodiments, the method may include receiving a second measurement from a second sensor of the marine vessel, where the second measurement comprises a second parameter representing a measurement relating to the geographical area of the first cell and/or the second cell. The second measurement from a second sensor may be sensor information that may be identical to or different from the first measurement. The second sensor may be utilized to improve the risk assessment, as more information may improve the probability that the risk assessment is correct. The classification unit may be adapted to work with a plurality of signal types at any one time, allowing the first sensor and the second sensor to be utilized to provide a risk parameter to the first cell and/or the second cell.

In one or more exemplary embodiments, the risk parameter may be a scaled risk parameter having a starting point where the risk is low and an ending point where the risk is high. The scaled risk parameter may, e.g., be between 0 and 100, where 0 is low risk and 100 is high risk. The first cell and/or the second cell, and any subsequent cell, may be assigned with a scaled risk parameter. The risk parameter may also be in other forms, such as a visual grayscale, where white is low risk and black is high risk, and the shade of gray between white and black indicates the risk factor.

In one or more exemplary embodiments, the different types of sensors may have different significance for the risk assessment. The significance may be different in different situations, where, e.g., an air ultrasound sensor has little or no significance when the marine vessel is in open water, it has high significance when manoeuvring close to stationary or dynamic objects in a harbor. In the same manner, an optical camera may have little significance when operating in low-light situations; the FLIR camera may have higher significance. Thus, even if the optical camera indicates a high risk, the FLIR camera may override the high risk, as the optical camera may be unreliable in low-light conditions. Thus, the first sensor may have lower significance for risk assessment than the second sensor, and where the first sensor is weighed less in the risk assessment than the second sensor.

The present disclosure also relates to a system for performing the method as disclosed, the system comprising: a sensor unit provided on a marine vessel and configured for performing the first measurement in real time, information relating to the first cell and/or the second cell, a processor associated with the sensor unit for collecting the first measurement, and configured to perform a risk assessment of the first measurement, and assigning the risk assessment to the first cell and/or the second cell in the map data, and a data communication means between the processor and a control unit of the marine vessel configured to provide control input to the control unit for providing navigation input to the marine vessel.

EXAMPLES

Data originating from LiDAR, RADAR, camera, FLIR and sound cannot easily be processed using conventional algorithms having high enough accuracy to be included in a sensor fusion. It may be useful to utilize Artificial Intelligence, such as a neural network, which is trained with a large amount of data for creating modules that are capable of processing live data in real time.

Model for Video

There is a large amount of video material of ships in all sizes and shapes, and types in a plurality of weather, light and visual conditions. The videos are split up into frames that are sorted into relevant and less relevant data. Some images having ships or boats are marked as useable to subsequent training for an AI algorithm, which builds an AI model for ship and boat recognition based on the training material. The collecting of videos has been done by capturing a marine drone having a camera, a land-based camera as well as a camera mounted on a tug boat (Danpilot 17). It is believed that it is necessary to collect 10,000 images for the AI model to label and recognize a not known marine vessel (not included in the training material) with a high degree of probability.

Awareness/Sensor Fusion

Data from all sensors is "fusioned" in a processor where the generation of the navigation instructions is performed. Each active sensor contributes with data input in the system, where specific data filtration, data processing and AI pattern recognition are integrated in a dynamic map model. The map model has a resolution that is suited for each separate application, and in each cell there is a summary of each of the sensor inputs which is used for the specific situation.

The quality of data for each sensor is dependent on the weight each sensor has on each cell. The autonomous system is capable of making decisions on navigation and to prepare a route based on the cells in accordance with the planned mission of the marine vessel.

The system is capable of changing the zoom level on the map and thereby the resolution, dependent on whether it is working with a simple route planning or whether there is a navigation including other marine vessels.

In a navigational situation where the marine vessel has to allow another vessel to pass, the system may disable the sensors that are not relevant for the maneuvering. At a very close passage, it may be understood that only the LiDAR and the ultrasound system is used, while all other sensors may be disconnected, and their importance is reduced in the cells.

BRIEF DESCRIPTION OF THE DRAWINGS

The following is an explanation of exemplary embodiments with reference to the drawings, in which.

DETAILED DESCRIPTION

Figure 1:
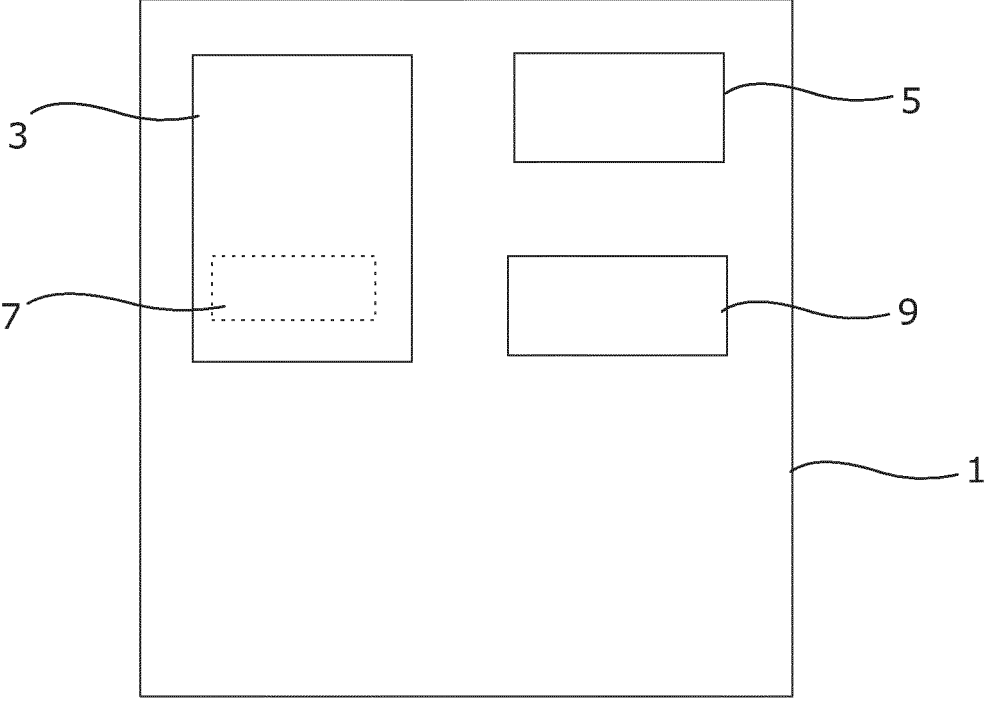
FIG. 1 shows a schematic view of a system in accordance with the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. FIG. 1 shows an exemplary architecture of a view of a system 1 in accordance with the present description. The system comprises a processor 3, a memory 5, a classification unit 7 (which may be part of the processor), and a communication unit 9.

Figure 2:
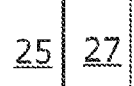
FIG. 2 shows a schematic view of a marine vessel in accordance with the present disclosure.
Figure 2:
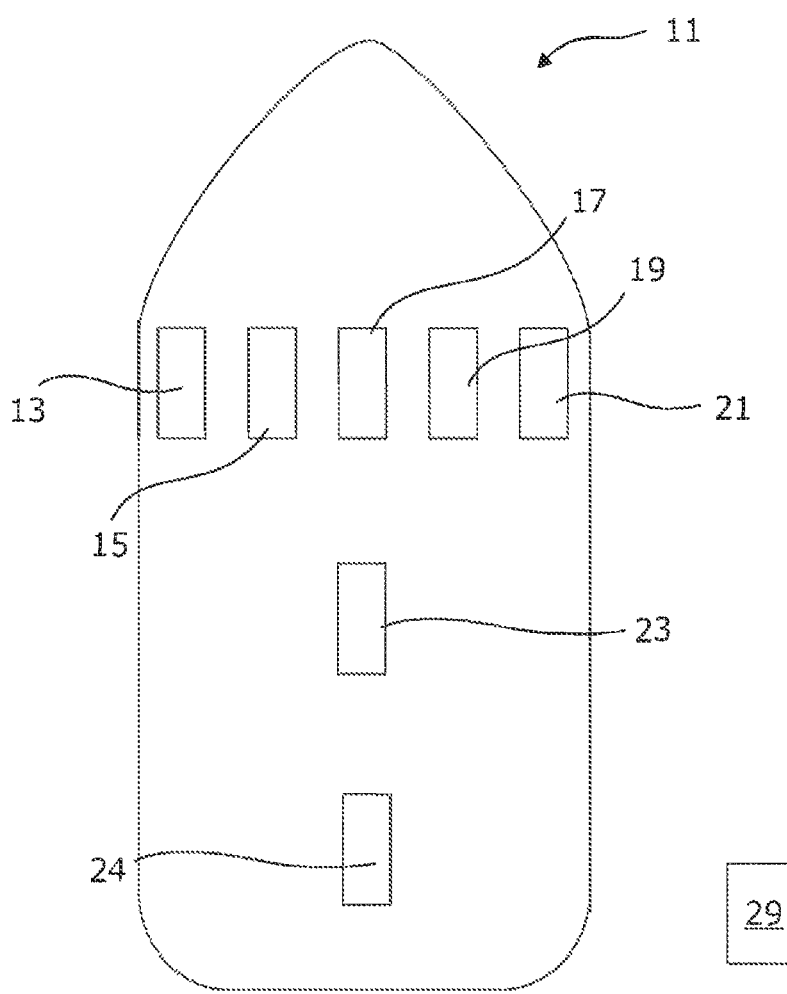

FIG. 2 shows a schematical view of a marine vessel 11 in accordance with the present disclosure. The marine vessel may comprise a first sensor 13, a second sensor 15, a third sensor 17, a fourth sensor 19, a fifth sensor 21 and a processor unit 23. The sensors may be adapted to sense conditions that occur distant to the marine vessel in a first cell 25, a second cell 27, and optionally a third cell 29.

The sensors 13, 15, 17, 19, 21 may, e.g., sense the presence of static or dynamic objects in the cells 25, 27 and 29, and where the processor unit 23 is capable of receiving the sensor information from one or more of the sensors 13, 15, 17, 19, 21, to determine a risk assessment of the cell 25, 27, 29. Based on the risk assessment, the processor provides a control unit 24 of the marine vessel 11 with navigational information on whether or not it is safe for the vessel to cross into the cells 25, 27, 29.

Figure 3:
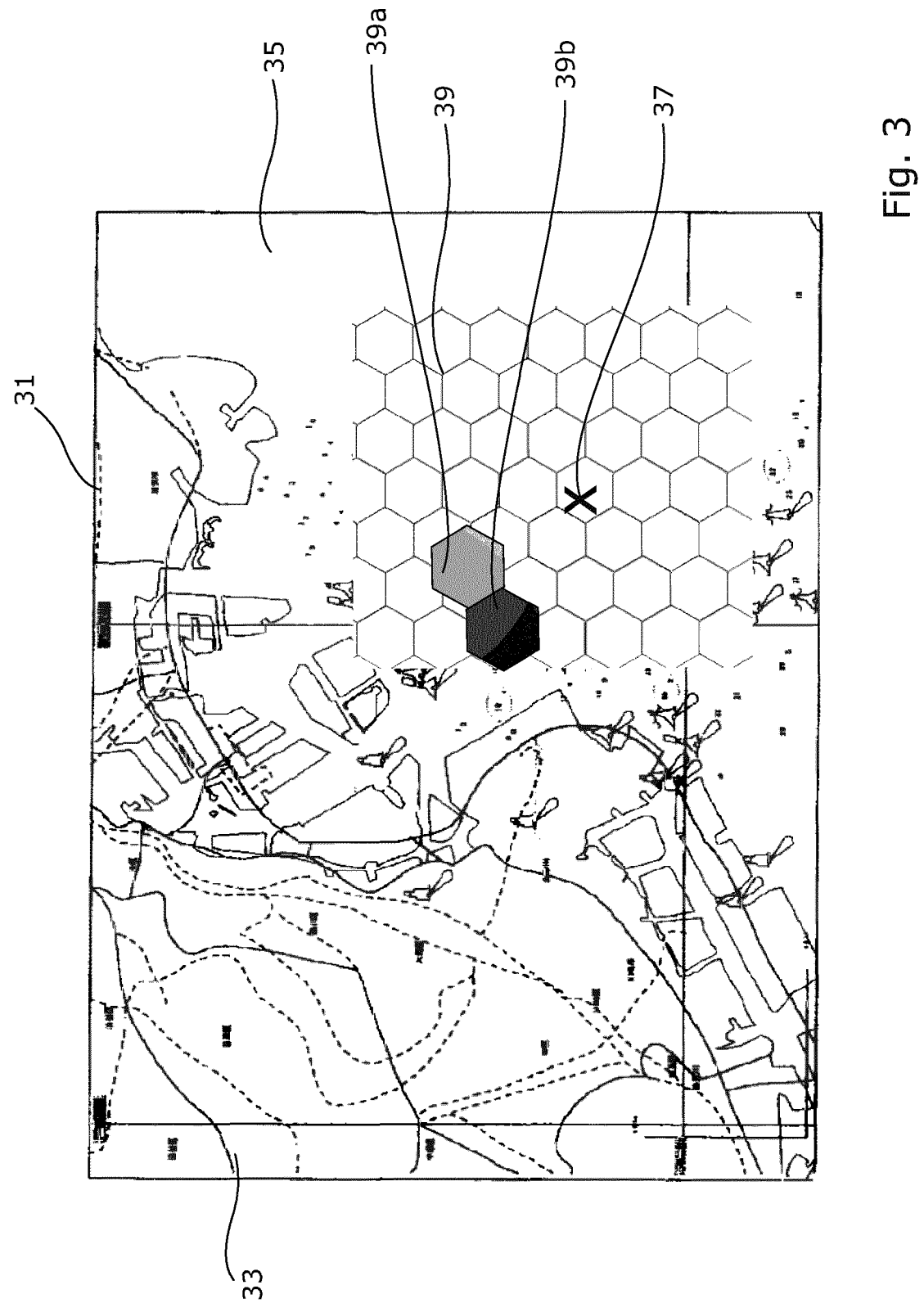
FIG. 3 shows an exemplary nautical map used in the present disclosure.

FIG. 3 shows an exemplary nautical map 31, where the shore 33 is shown on the left side and the body of water 35 is shown on the right side. The nautical map data may be provided in a digital manner in the form of electronic map data, where FIG. 3 is a graphical representation of electronic map data. A marine vessel 37 may be seen on the map, where the areas of the map surrounding the marine vessel 37 may be seen as being divided into a plurality of cells 39, each having a separate risk assessment and/or risk parameter. The risk parameter may here be seen as a grayscale pattern, where the white areas are safe, while cell 39a has a medium risk and cell 39b has a high risk. Thus, during navigation, the marine vessel 37 will avoid cells 39a and 39b, while being capable of sailing or operating in the other zones. The size of the cells in FIG. 3 is exemplary for illustration purposes, and the size of the cells may vary and may be an area that varies between 1-100 m².

Figure 4:
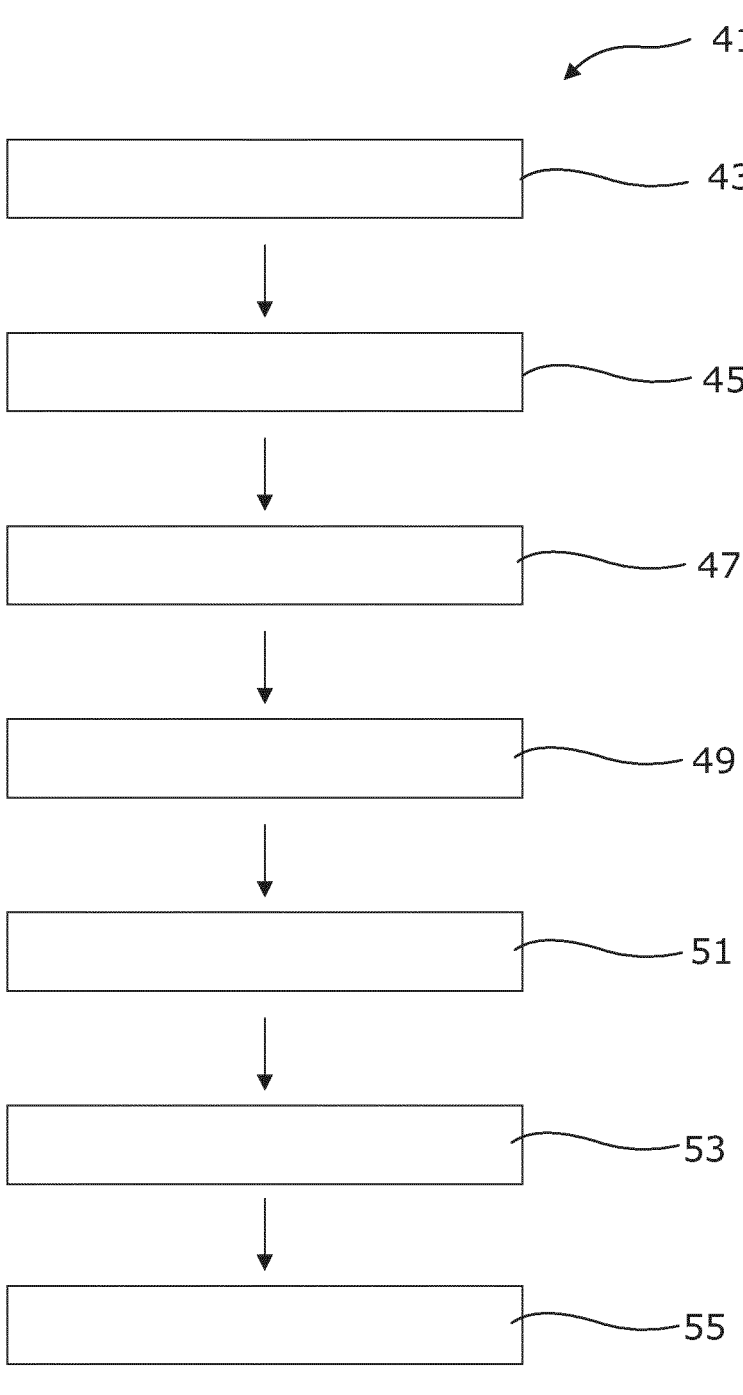
FIG. 4 shows the steps of the method in accordance with the present disclosure.

FIG. 4 shows the steps of the method 41 according to the present disclosure, where the method comprises the steps of providing map data 43, dividing the map data into a first cell and a second cell defining a fixed geographical area of the map data 45, receiving a first measurement from a first sensor of the marine vessel 47, where the first measurement comprises a first sensor parameter representing a measurement relating to the geographical area of the first cell and/or the second cell 49, determining a risk assessment of the first sensor parameter 51, assigning a first risk parameter to the first cell and/or the second cell 53, operating the marine vessel based on the first risk parameter of the first cell and/or the second cell 55.

The use of the terms "first", "second", "third" and "fourth", "primary", "secondary", "tertiary", etc., does not imply any particular order, but are included to identify individual elements. Moreover, the use of the terms "first", "second", "third" and "fourth", "primary", "secondary", "tertiary", etc., does not denote any order or importance, but rather the terms "first", "second", "third" and "fourth", "primary", "secondary", "tertiary", etc., are used to distinguish one element from another. Note that the words "first", "second", "third" and "fourth", "primary", "secondary", "tertiary", etc., are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

1 A system according to the description
3 Processor
5 Memory
7 Classification unit
9 Communication unit
11 Marine vessel
13 First sensor
15 Second sensor
17 Third Sensor
19 Fourth Sensor
21 Fifth Sensor
23 Processor unit
24 Control unit
25 First cell
27 Second cell
29 third cell
31 Nautical map
33 Shore
35 Body of water
37 Vessel
39 Cell
39a Cell
39b Cell
41 Method
43 Method step 1
45 Method step 2
47 Method step 3
49 Method step 4
51 Method step 5
53 Method step 6
55 Method step 7

The invention claimed is:

1. A method of providing an electronic map for operating a marine vessel
   using a processor, providing electronic map data,
   dividing the electronic map data into a first cell and a second cell defining a fixed geographical area of the map data,
   receiving a first measurement from a first sensor of the marine vessel, where the first measurement comprises a first sensor parameter representing a measurement relating to the geographical area of the first cell and/or the second cell,
   receiving a second measurement from a second sensor of the marine vessel, where the second measurement comprises a second sensor parameter representing a measurement relating to the geographical area of the first cell and/or the second cell, where the second sensor is of a different type than the first sensor,
   using a processor, processing the data from the first sensor and the second sensor to determine a first risk assessment of the first sensor parameter and a second risk assessment of the second sensor parameter,
   assigning a first risk parameter to the first cell and/or the second cell based on the first risk assessment and/or the second risk assessment, and
   establishing, using the processor, navigation input for the marine vessel based on the first risk parameter of the first cell and/or the second cell and operating the marine vessel to follow the navigation input.

2. A method in accordance with claim 1, wherein the first cell and the second cell have a geographical area, and/or where the geographical area has a predefined size.

3. A method in accordance with claim 1, wherein the electronic map data is a marine chart data.

4. A method in accordance with claim 1, wherein the risk assessment comprises identifying possible objects present in the first cell and/or the second cell.

5. A method in accordance with claim 1, wherein the electronic map data may be divided into a plurality of cells.

6. A method in accordance with claim 1, wherein the first sensor parameter is input into a machine learning unit, where content of the first sensor parameter is processed to recognize information available from the first sensor parameter.

7. A method in accordance with claim 1, wherein the first cell abuts the second cell in a geographical manner.

8. A method in accordance with claim 1, wherein the electronic map data includes data or measurements of depth in a body of water.

9. A method in accordance with claim 1, wherein the receiving of the first measurement is performed at regular intervals.

10. A method in accordance with claim 1, wherein the first risk parameter is based on a plurality of measurement parameters.

11. A method in accordance with claim 1, wherein each of the first sensor comprises one or more of LiDAR, RADAR, optical camera, FLIR Camera, Multibeam Sonar, Ultrasound, and Acoustic Microphone, but the second sensor is different than the first sensor.

12. A system for performing the method of claim 1 comprising:
   a sensor provided on a marine vessel and configured for performing the first measurement in real time, information relating to the first cell and/or the second cell, the processor being associated with the sensor and configured to collect the first measurement, and configured to perform a risk assessment of the first measurement, and assigning the risk assessment to the first cell and/or the second cell in the electronic map data, and a data communication link between the processor and a controller of the marine vessel configured to provide control input to the controller for providing the navigation input to the marine vessel.

13. A method in accordance with claim 1, wherein the risk parameter is a scaled risk parameter having a starting point where the risk is low and an ending point where the risk is high.

14. A method in accordance with claim 1, wherein the different types of sensors have different significance for risk assessment.

* * * * *